US006931169B2

(12) United States Patent
Zhang et al.

(10) Patent No.: US 6,931,169 B2
(45) Date of Patent: Aug. 16, 2005

(54) OPTICAL SWITCH WITH REVERSIBLE ELECTROPLATING MIRRORS

(76) Inventors: Jiangjun Zhang, 22090 Wallace Dr., Cupertino, CA (US) 95014; Peiching Ling, 1439 Royal Ann Ct., San Jose, CA (US) 95129; Jinliang Chen, 13335 Quito Rd., Saratoga, CA (US) 95070; Ming Xu, 6181 Camino Verde D#P-6, San Jose, CA (US) 95119

( * ) Notice: Subject to any disclaimer, the term of this patent is extended or adjusted under 35 U.S.C. 154(b) by 344 days.

(21) Appl. No.: 10/068,269

(22) Filed: Feb. 5, 2002

(65) Prior Publication Data

US 2003/0152315 A1 Aug. 14, 2003

(51) Int. Cl.[7] ................................................ G02B 6/35
(52) U.S. Cl. .............................. 385/18; 385/16; 385/40; 385/141
(58) Field of Search ........................ 385/15–24, 39–41, 385/141–145

(56) References Cited

U.S. PATENT DOCUMENTS 6,215,920 B1 * 4/2001 Whitehead et al. ........... 385/18
6,449,406 B1 * 9/2002 Fan et al. ..................... 385/17
2003/0108276 A1 * 6/2003 Janssen ........................ 385/18

* cited by examiner

Primary Examiner—Akm Enayet Ullah
Assistant Examiner—Kevin S. Wood
(74) Attorney, Agent, or Firm—Bo-In Lin

(57) ABSTRACT

The present invention discloses an optical switching element that uses reversible electroplating mirrors includes a trench with transparent sidewalls located at the intersection of two waveguides A and B. The trench has two electrodes; one, which is transparent, is placed on the trench sidewall and the other is placed on the trench floor. The trench is filled with an index-matching electrolytic solution containing ions of a metal that can electro-deposit on these two electrodes. To actuate the switching element, a negative electrical potential is applied to the sidewall electrode. Actuation causes metal deposits to form on the sidewall electrode, creating a mirror that reflects light from waveguide A to waveguide B. To deactivate the switching element, a positive electrical potential is applied to the sidewall electrode. Deactivation causes metal deposits move off the sidewall and form on the trench floor. The lack of metal deposits on the sidewall allows light to pass through the switching element and continue along the original waveguide A

17 Claims, 9 Drawing Sheets

OPTICAL SWITCH WITH REVERSIBLE ELECTROPLATING MIRRORS

BACKGROUND OF THE INVENTION

1. Field of the Invention

This invention relates generally to optical switching elements, in particular, optical switches implemented using reversible electroplating mirrors.

2. Description of the Related Art

Current state of the art in optical routing and signal switching system is still faced with limitations that the optical switching devices are not able to satisfy many requirements demanded by modern fiber optical communication systems. Specifically, with the advancement of network communication technology, the modern fiber optical communication systems require an optical switch that can be produced at low-cost, has a low power consumption requirement, can achieve fast switching speed, reliable, and scaleable to a large number of ports. However, such optical switch is not yet available. The demand is ever more pressing as much of the information in telecommunication and data communication systems is now carried over optical networks. The amount of information and the speed with which it must be transmitted necessitates the deployment of large number of optical switches that can handle millions of bits per second. The increased amount of information transmitted over optical networks has created a high demand for optical switches, which can switch quickly, and are cost-effective and reliable.

The primary optical switching technologies used today are Micro Electro-Mechanical Systems (MEMS), liquid crystals, and bubbles. Each of these technologies has its advantages and disadvantages. Switching using MEMS-based 2D or 3D tiny mirrors is done using miniaturized mirrors fabricated on a single chip. Although these switches are small in size and can be produced economically, problems arise from their mechanical nature. The moving parts in MEMS-based switches increase switching times, consume more power, and make them difficult to package reliably. Switches that use liquid crystal technologies as described in U.S. Pat. No. 6,266,109 to Yamaguchi et al. and U.S. Pat. No. 6,289,145 to Solgaard et al. rely on polarization changes to reflect light. Since they are solid-state devices, liquid-crystal-based switches do not have the issues MEMS-based switches have regarding switching speeds, power consumption and reliable packaging. The challenge in using liquid crystal technologies for optical switches is that liquid crystal properties change with changes in temperature; thus, the temperature in the switch must be regulated for proper operation. A second problem is that liquid-crystal-based switches do not scale well to a large number of ports. The switches described in U.S. Pat. No. 4,988,157 to Jackel et al. and U.S. Pat. No. 4,988,157 to Fouquet et al., use bubbles created in an index-matching fluid to reflect light. Being solid-state devices, bubble-based switches have similar advantages as liquid-crystal-based switches over mechanical switches. Additionally, bubble-based switches are not affected by the temperature variations that plague liquid-crystal based switches. However, bubble technology has switching reliability problems and insertion loss when used in large-scale switches.

A Reversible Electrochemical Mirror (REM) is one possible technology for building optical switching elements. U.S. Pat. No. 6,111,685 to Tench et al. describes an REM device that is used on building vehicle windows to regulate the amount of sunlight that enters and thus reduce the amount of heat generated (via the greenhouse effect). The disclosure made in U.S. Pat. No. 6,111,685 is hereby incorporated as reference in this Application. In a REM-based smart window, the amount of sunlight that passes through is determined by the reflectivity of the window. Such windows are inexpensive to manufacture, require little voltage to operate, and are highly effective in avoiding inside heating. Although REM technology has been applied to variable-transmission windows, this type of mirror has not been applied to optical switching applications.

Therefore, a need still exists in the art to provide an innovative method for constructing optical switches taking advantage of the REM technologies. It is desirable that the improved optical switch is able to satisfy the requirements that the optical switch can be produced at low-cost, has a low power consumption requirement, can achieve fast switching speed, reliable, and scaleable to a large number of ports is not yet available.

SUMMARY OF THE INVENTION

The optical switch device of this invention uses reversible electroplating mirrors to reflect light from one optical path to a second optical path. A switching element used in such a device has a trench with transparent sidewalls located at the intersection of two waveguides A and B. When the switching element is actuated, metal deposits form on the sidewall of the trench, thus creating a mirror that reflects light from waveguide A to waveguide B. An actuated switching element is said to be in a reflecting state. When the switching element is deactivated, metal deposits move off the sidewall and form on the trench floor. The mirror is effectively removed from the sidewall, which allows light to pass through the switching element and continue unhindered along the original waveguide A. A deactivated switching element is said to be in a transmitting state.

In order to cause the switch to transition from a reflecting state to a transmitting state and vice versa, electrodes are placed on one of the sidewalls and on the floor of the trench. To enable a mirror to form on the sidewall, a mirror deposit is reversibly plated on and dissolved from the sidewall electrode. Note that the sidewall electrode is formed as transparent electrode such that the light can pass through without being diverted when the switch is in a transmitting state. To enable the removal of the mirror from the sidewall, the reverse process of the metal plating occurs by having the plated metal ions moved away and dissolving from the sidewall and then moved to the floor electrode. The trench is filled with an index-matching electrolytic solution containing ions of a metal that can be electro-deposited onto electrodes and halide and/or pseudo-halide anions. The high molar concentration ratio of halide and pseudo-halide anions to the electro-depositing metal ions in the solution provides stability, high deposit quality, good deposit erasure, and long cycle life needed for optical switching applications.

Actuation is achieved by applying a negative electrical potential to the sidewall electrode relative to the floor electrode. The applied potential causes deposited metal to be dissolved from the floor electrode into the electrolytic solution and to be electro-deposited from the solution onto the sidewall electrode as a mirror deposit. The resulting mirror layer that forms on the sidewall electrode causes light to be reflected from its original waveguide A to an outgoing waveguide B. Conversely, when the polarity is reversed and a positive electrical potential to the sidewall electrode relative to the floor electrode, metal dissolves from the sidewall electrode into the electrolytic solution and is electrodeposited from the solution onto the floor electrode. The sidewall electrode's resulting lack of mirror deposit enables light to pass through the switch and continue on its original waveguide A. Note that the mirror deposit that forms on the floor electrode does not interfere with light passing through the switch.

In the preferred embodiment, there is a matrix of optical switches for controlling optical communication between input optical paths and output optical paths that cross the input paths. The optical paths may be waveguides in the form of optical fibers or waveguide structures fabricated on a substrate.

The sidewall electrode is typically indium tin oxide (ITO) or fluorine doped tin oxide (FTO) deposited on a transparent glass or plastic pane, which serves as the substrate. It is usually necessary to also apply a surface modification layer to the sidewall electrode to ensure uniform nucleation so that a mirror electro-deposit having high reflectivity is obtained. The surface modification layer may be a thin layer of an inert metal (i.e., sufficiently thin to be nominally transparent), which is electrochemically more stable towards oxidation than the electro-deposited metal. Finally, an under-layer may be added between the sidewall electrode and the surface modification layer to improve adhesion.

The floor electrode is electrochemically stable or is covered with a sufficient thickness of an active metal layer to avoid exposure of the floor electrode surface. It may also be protected from exposure to the electrolyte by a coating of an electrochemically stable metal. The surface of the electrode may be roughened to reduce reflection of radiation from the electrode or to improve switching speed by lowering the current density.

These and other objects and advantages of the present invention will no doubt become obvious to those of ordinary skill in the art after having read the following detailed description of the preferred embodiment which is illustrated in the various drawing figures.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Figure 1:
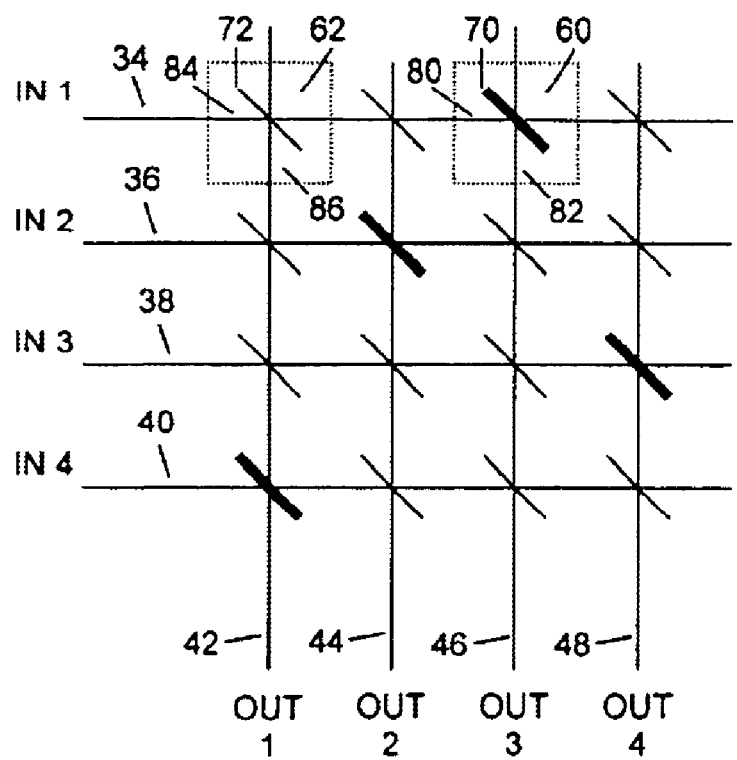
FIG. 1 is a top view of a matrix of optical switches described in the preferred embodiment. Such a configuration allows one to selectively connect a linear array of input optical paths to a linear array of output optical paths.

FIG. 1 is a 4×4 matrix of optical switching elements. This optical switch matrix includes a plurality of optical switches 12 of this invention disposed on the intersections of two waveguides. Each optical switch is formed in a trench located at an intersection of two waveguides. The angle of the intersection optical switches relative to the input and output waveguides is selected such that light is reflected from the input to output path when the optical switch is in a reflecting state. When the optical switch is in a transmitting state, the light passes through the switching element unhindered.

The intersection optical switches are arranged in a matrix formed by the intersection of input waveguides 34, 36, 38, 40 and output waveguides 42, 44, 46, 48. This matrix configuration allows the optical signals transmitted in any input waveguide 34, 36, 38, 40 to selectively switch to each one of output waveguide 42, 44, 46, 48. Although this figure illustrates a matrix of four rows and four columns, an optical switch matrix may be comprised of any number of input waveguides and output waveguides, having a commensurate number of intersection optical switches at the intersections thereof. Furthermore, while illustrated as intersecting at right angles, input waveguides 34, 36, 38, 40 and output waveguides 42, 44, 46, 48 may intersect at angles other than right angles.

In the figure, optical switches 12 in a reflecting state 70 are represented by broad lines drawn through the intersection of two waveguides, and optical switches in a transmitting state 72 are represented by a thin line drawn through the intersection of two waveguides. Therefore, the input segment 80 is in optical communication with output segment 82 as a result of reflection at the actuated switching element 70. In contrast, the input segment 84 is not in optical communication with output segment 86, because the switching element 72 is in a transmitting state, allowing light pass through it. Likewise, all other intersections for allowing the input waveguide 34 to communicate with the output waveguide 46 are in a transmitting state; therefore, a signal that is generated at input waveguide 34 will be received at output waveguide 46. Similarly, input waveguide 36 is optically connected to output waveguide 44, input waveguide 38 is optically connected to output waveguide 48, and input waveguide 40 is optically connected to output waveguide 42. Therefore, the matrix is a non-blocking optical cross-connect suitable for telecommunications or data communications.

Figure 2:
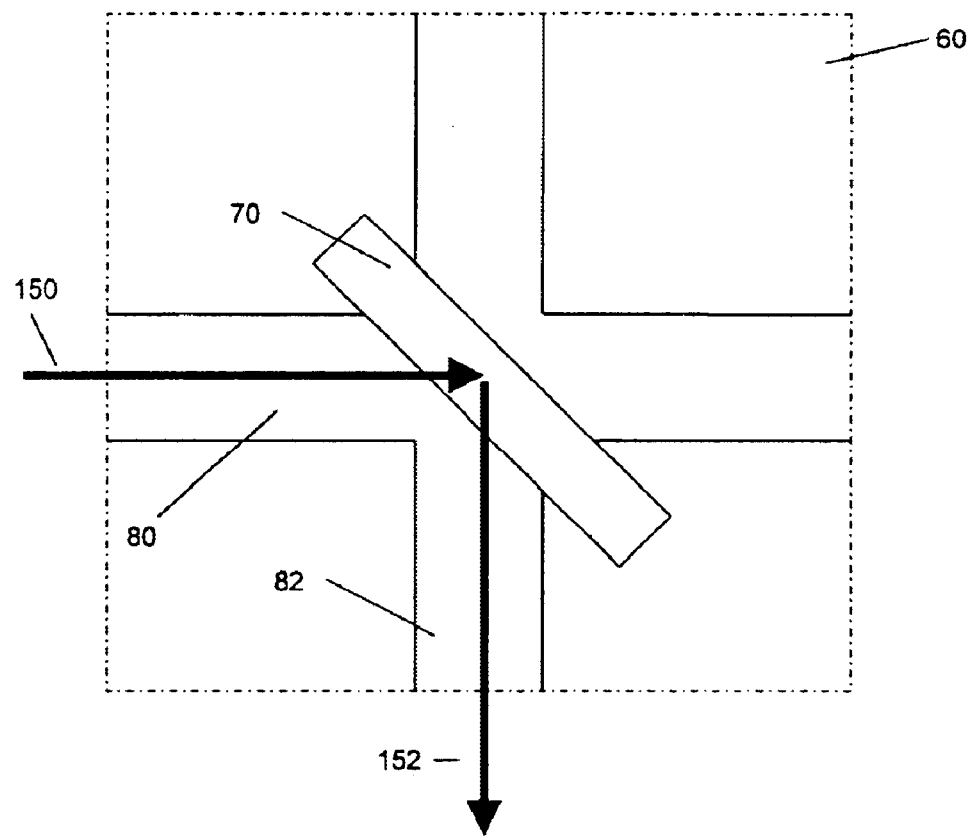
FIG. 2 is a top view of a switching element from FIG. 1 in a reflecting state.

FIG. 2 is a switching element 70 located at the intersection of two waveguide segments 80 and 82. The switching element shown here is in a reflective state, which causes incoming light 150 traveling along the input segment 80 to be reflected by the switch to the outgoing segment 82.

Figure 3:
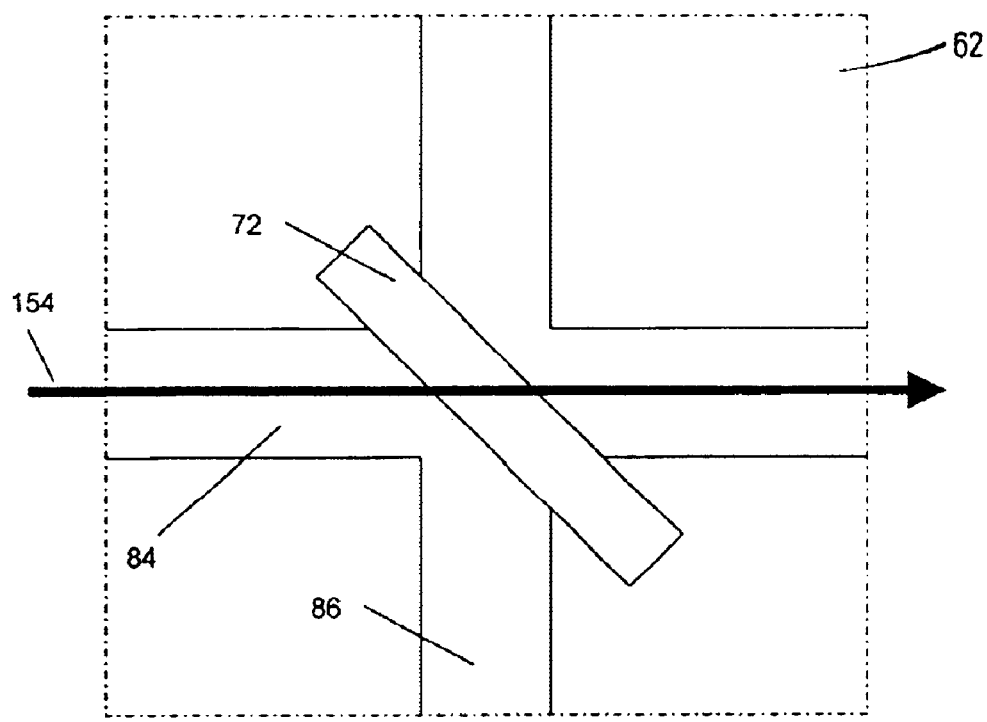
FIG. 3 is a top view of a switching element from FIG. 1 in a transmitting state.

FIG. 3 is a switching element 72 located at the intersection of two waveguide segments 84 and 86. The switching element shown here is in a transmitting state, which causes incoming light 154 traveling along the input segment 84 to pass through the switch and continue along the same segment unhindered.

Figure 4:
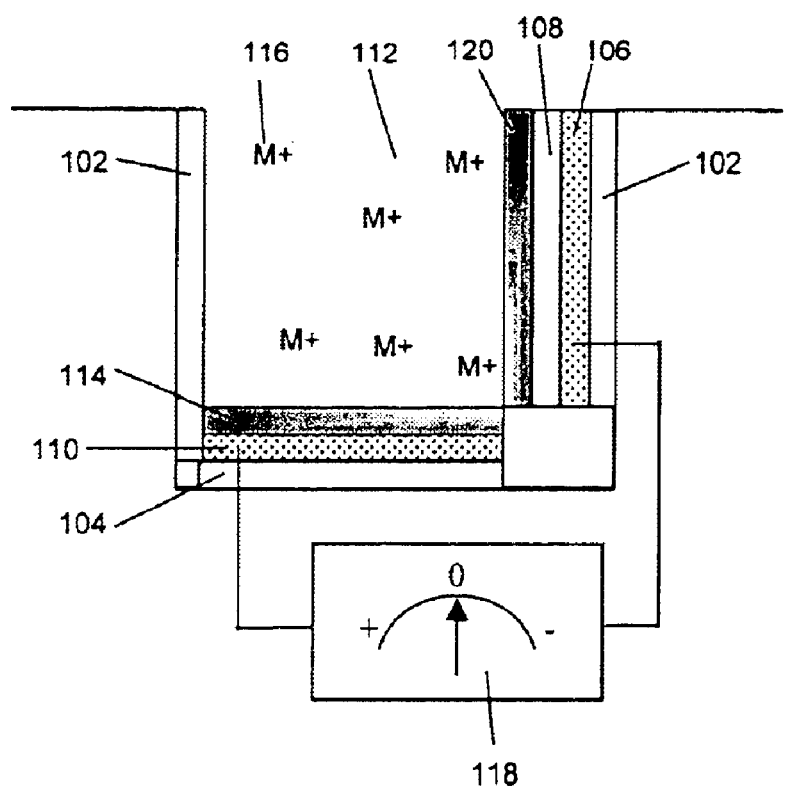
FIG. 4 is a cross sectional view of an optical switch using reversible electroplating mirrors.

FIG. 4 is a cross sectional view of an optical switch constructed according to this invention. It is to be noted that some dimensions in the figures are disproportionate for the purpose of more effectively illustrating the structure of the invention. The right sidewall of the trench shown in this figure is made up a first substrate, 102, which is substantially transparent to the portion of the spectrum of electromagnetic radiation that is to pass through the optical switch. An electrically conducting film 106, which is also substantially transparent, is deposited on the sidewall substrate. Finally, an electrochemically stable surface layer 108 for optional modification is applied to the film to facilitate the formation of a highly reflective mirror deposit. The resulting film 106 functions as the sidewall electrode. The floor of the trench is made up a second substrate 104. An electrically conducting film 110 is deposited on the floor substrate. The floor electrode can alternatively be a bulk electrode eliminating the need for the second substrate 104. The floor electrode 110 is electrochemically stable or is covered with a sufficient thickness of an active metal layer 114 to avoid exposure of the floor electrode surface. It may be protected from exposure to the electrolyte by a coating of electrochemically stable metal. Finally, the surface of the electrode 110 may be roughened, thus lowering the current density, to reduce the amount of time it takes for metal to switch from one electrode to the other.

An electrolytic solution 112 is placed in the trench and in electrical contact with the two electrodes, 106 and 110. This solution contains a solvent, electro-deposition mirror metal cations, and halide and/or pseudo-halide anions, with the total molar concentration ratio of halide and/or pseudo-halide anions relative to the electro-deposition metal cations greater than a ration of 6 to 1.

A metallic layer is initially deposited on the sidewall electrode 106, the floor electrode 110, or, as shown in FIG. 1, on both electrodes. In the figure, layers 114 and 120 represent these metallic layers. The metal ions 116, which contain the same metal atoms as on layers 114 and 120, are dissolved within the electrolytic solution 112 such that the metal atoms can be reversibly electro-deposited on and electro-dissolved from the sidewall and floor electrodes. Finally, a source of electrical potential 118, which has a reversible polarity, is connected between the sidewall and floor electrodes 106 and 110.

Figure 5:
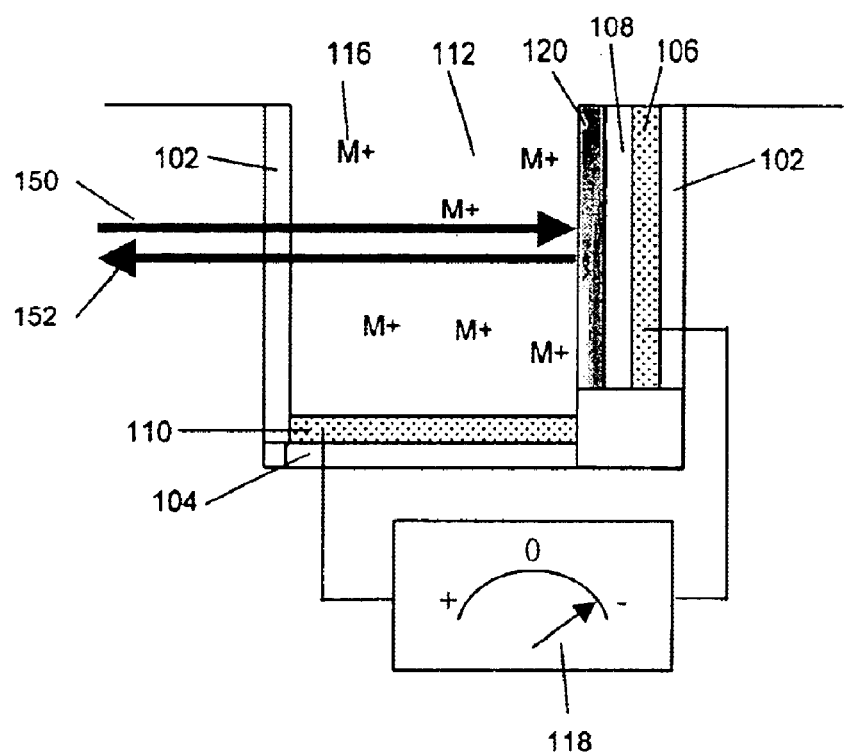
FIG. 5 is a cross sectional view similar to FIG. 4 for showing a switch in a reflecting state with sidewall electrode at negative electric potential to cause substantial quantities of the metal to deposit onto the sidewall.

FIG. 5 is a cross sectional view similar to FIG. 4 while showing the result of applying a negative electrical potential to the sidewall electrode 106 relative to the floor electrode 110. When this occurs, metal deposited on the floor electrode 110 is dissolved from the floor electrode into the electrolytic solution 112. At the same time, metal ions 116 in the solution are electro-deposited from the solution onto the sidewall electrode 106 to form the mirror layer 120. This mirror layer 120 causes incoming light 150 to be reflected to a different optical path 152.

Figure 6:
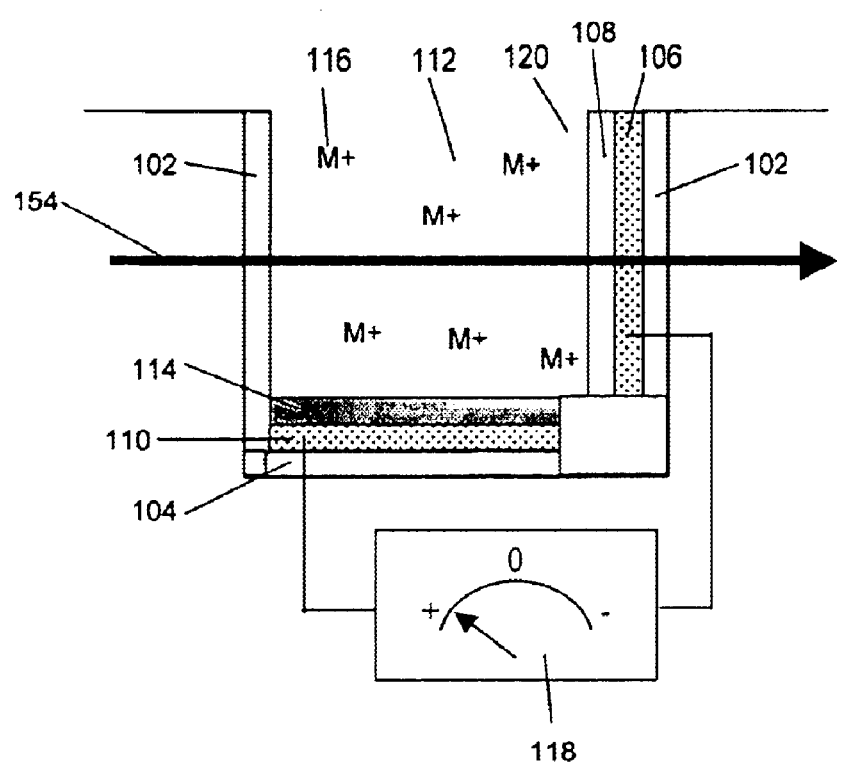
FIG. 6 is a cross sectional view similar to FIG. 4 for illustrating a switch in a transmitting state with the sidewall substantially free of metal deposits thus allowing light to pass through the switching element.

FIG. 6 is a cross sectional view similar to FIG. 4 while showing the result of applying a positive electrical potential to the floor electrode 110 relative to the sidewall electrode 106. When this occurs, metal deposited on the sidewall electrode 106 dissolves into the electrolytic solution 112. At the same time, metal ions 116 in the solution are electro-deposited from the solution onto the floor electrode 110 to form the mirror layer 114. The mirror layer 114 that forms on the floor of the trench has no effect on light 154 that enters the switch. However, the floor electrode 110 is provide to enable the removal of the mirror layer from the sidewall electrode, which allows incoming light 154 to pass through the switch unhindered. The lower limit of reflectivity for the switch is affected by the reflectivity of the nucleation layer 108, the electrode 106, and the substrate 102 and the variations of the reflectivity may be reduced by using anti-reflection coatings and by adjusting layer thickness.

Figure 7:
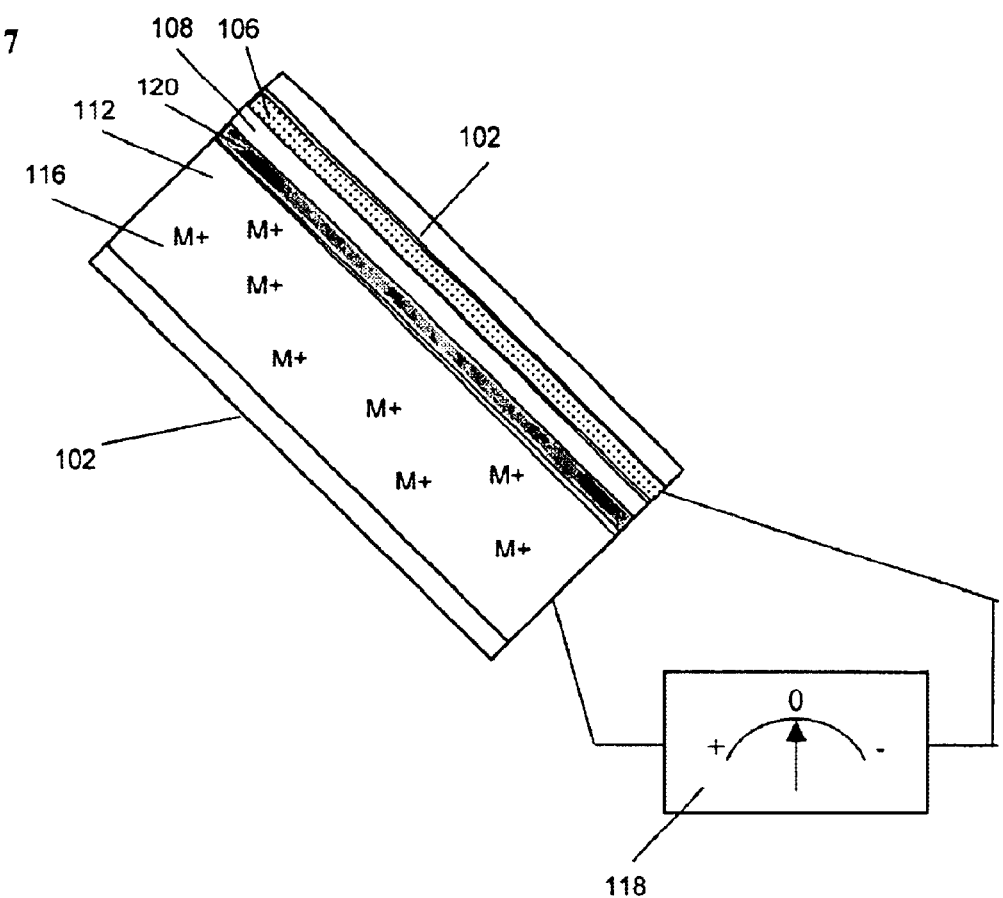
FIG. 7 is a top view of an optical switch using reversible electroplating mirrors.

FIG. 7 is a top view of the optical switch shown in FIG. 4. In this view, all the layers are the same as described above for FIG. 4, with the only difference being that in this view, the floor layers can not be seen.

Figure 8:
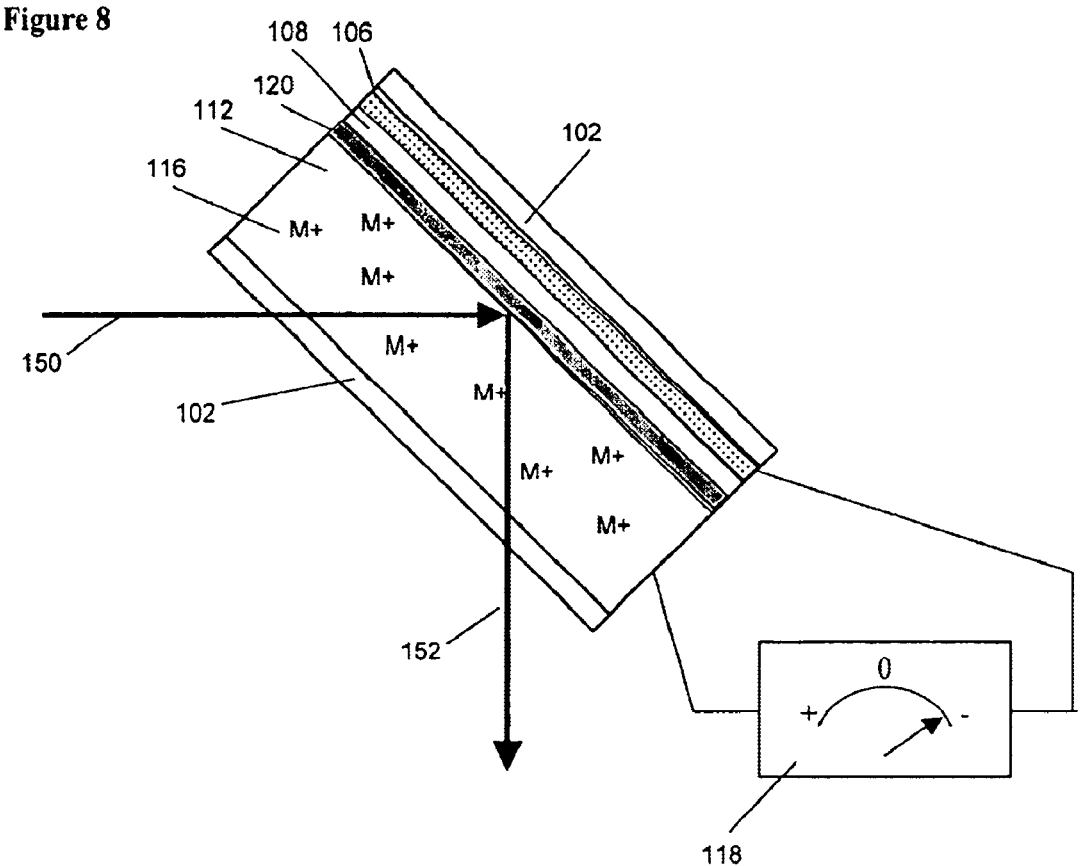
FIG. 8 is a top view similar to FIG. 7 that illustrates the switch in a reflecting state as shown in FIG. 5.

FIG. 8 is a top view similar to FIG. 7, but is depicting the result of applying a negative electrical potential to the sidewall electrode 106 relative to the floor electrode, which cannot be seen in this view because it is on the floor of the trench. When this occurs, metal deposited on the floor electrode is dissolved from the floor electrode into the electrolytic solution 112. At the same time, metal ions 116 in the solution are electro-deposited from the solution onto the sidewall electrode 106 to form the mirror layer 120. This mirror layer 120 causes incoming light 150 to be reflected to a different optical path 152.

Figure 9:
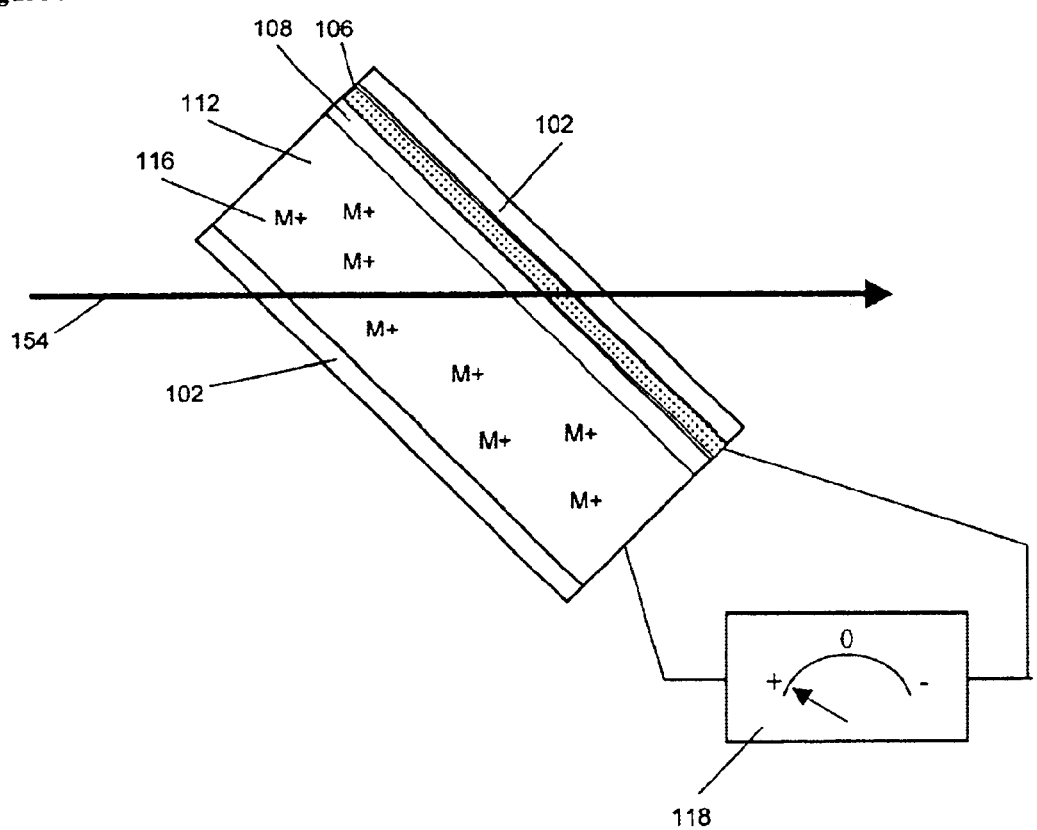
FIG. 9 is a top view similar to FIG. 7 that illustrates the switch in a transmitting state as shown in FIG. 6.

FIG. 9 is a top view similar to FIG. 7, but is depicting is depicting the result of applying a positive electrical potential to the floor electrode, which cannot be seen in this view, relative to the sidewall electrode 106. When this occurs, metal deposited on the sidewall electrode 106 dissolves into the electrolytic solution 112. At the same time, metal ions 116 in the solution are electro-deposited from the solution onto the floor electrode. The removal of the mirror layer from the sidewall electrode allows incoming light 154 to pass through the switch unhindered.

In summary, this invention discloses an optical device disposed in a trench defined by optical transmissive trench sidewalls. The optical device includes a medium fills the trench with an electro-magnetically controllable medium property for controlling an optical transmission through the trench and the trench sidewalls. In a preferred embodiment, the medium property includes an electro-magnetically-controllable ion-deposition on the trench sidewalls for controlling a reflective-transmissive optical path through the trench sidewalls. In another preferred embodiment, the optical device further includes an electromagnetic means for applying an electromagnetic field on the medium for controlling the medium property for controlling the optical path. In another preferred embodiment, the optical device further includes an electrode disposed near the trench sidewalls for applying an electromagnetic field on the medium for controlling the medium property. In another preferred embodiment, the optical device further includes an electrode disposed near the trench sidewalls for applying an electromagnetic field on the medium for controlling the electro-magnetically controllable ion-deposition on the trench sidewalls for controlling a reflective-transmissive optical path through the trench sidewalls. In another preferred embodiment, the optical device further includes a second electrode disposed near a trench floor surface of the trench for applying a second electromagnetic field on the medium for controlling the electro-magnetically controllable ion-deposition on the trench floor surface. In another preferred embodiment, the medium comprises an electrolytic solution filled in the trench wherein the electrolytic solution containing cations of an electro-depositing mirror metal for responding to an electrical field applied to the medium.

In summary, this invention further discloses a method for forming an optical device in a trench defined by optical transmissive trench sidewalls. The method includes a step of filling the trench with a medium having an electro-magnetically-controllable medium property for controlling an optical transmission through the trench and the trench sidewalls. In a preferred embodiment, the step of filling the trench with the medium is a step of filling the trench with a medium having a property of electro-magnetically controllable ion-deposition on the trench sidewalls for controlling a reflective/transmissive optical path through the trench sidewalls. In another preferred embodiment, the method further includes a step of applying an electromagnetic field on the medium for controlling the medium property for controlling the optical path. In another preferred embodiment, the method further includes a step of disposing an electrode near the trench sidewalls for applying an electromagnetic field on the medium for controlling the medium property. In another preferred embodiment, the method further includes a step of disposing an electrode near the trench sidewalls for applying an electromagnetic field on the medium for controlling the electro-magnetically controllable ion-deposition on the trench sidewalls for controlling a reflective/transmissive optical path through the trench sidewalls. In another preferred embodiment, the method further includes a step of disposing a second electrode near a trench floor surface of the trench for applying a second electromagnetic field on the medium for controlling the electro-magnetically controllable ion-deposition on the trench floor surface. In another preferred embodiment, the step of filling the trench with the medium is a step of filling the trench with a the comprising an electrolytic solution containing cations of an electro-depositing mirror metal for responding to an electrical field applied to the medium.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical switch disposed at an intersection of two waveguides comprising:
   a trench defined by two sidewalls and a trench floor surface extending across said intersection of said two waveguides;
   a first electrode disposed near one of said two sidewalls and a second electrode disposed near said trench floor surface of said trench;
   an electrolytic solution filled in said trench wherein said electrolytic solution containing cations of an electro-depositing mirror metal for responding to an electrical field applied to said first and second electrodes to form an optical reflective surface on one of said sidewalls for reflecting an optical signal from one of said two waveguides to another one of said two waveguides; and
   said electrolytic solution further includes at least one halide and/or pseudohalide compound having cations that are not electroactive in a voltage range applied to said electrodes.

2. The optical switch of claim 1 wherein:
   a ratio of a total molar concentration of said halide and/or pseudohalide anions representing an total aggregate of anions originating from said halide and/or pseudohalide compound and anions originating from said source of said cations of said electro-depositing mirror material, to a total molar concentration of said cations of said electro-depositing mirror material being greater than a ratio of six to one.

3. The optical switch of claim 1 further comprising:
   an electromagnetic means for applying said electric field to said electrodes for actuating said optical switch.

4. The optical switch of claim 3 wherein:
   said electromagnetic means is provided for applying a negative electric field to said first electrodes near one of said sidewalls for actuating said optical switch.

5. The optical switch of claim 3 wherein:
   said electromagnetic means is provided for applying a negative electric field to said second electrodes near said trench floor surface for deactivating said optical switch.

6. The optical switch of claim 1 further comprising:
   an antireflective layer formed on said sidewalls.

7. The optical switch of claim 4 wherein:
   said electromagnetic means is further provided for applying a positive electric field to said second electrodes near said trench floor surface for enhancing an operation of actuating said optical switch.

8. The optical switch of claim 5 wherein:
   said electromagnetic means is further provided for applying a positive electric field to said first electrodes near one of said sidewalls for enhancing an operation of deactivating said optical switch.

9. The optical switch of claim 1 wherein:
   said electrodes are optical transmissive electrodes.

10. The optical switch of claim 1 wherein:
    said optical switch and said waveguides are supported on a substrate.

11. An optical device disposed in a trench defined by optical transmissive trench sidewalls comprising:
    a medium filling the trench with an electro-magnetically controllable medium property for controlling an optical transmission through said trench and said trench sidewalls;
    said medium comprising an electrolytic solution filled in said trench wherein said electrolytic solution containing cations of an electro-depositing mirror metal for responding to an electrical field applied to said medium; and
    said electrolytic solution further includes at least one halide and, or pseudohalide compound having cations that are not electroactive in a voltage range applied to said electrodes.

12. The optical device of claim 11 wherein:
    a ratio of a total molar concentration of said halide and, or pseudohalide anions representing an total aggregate of anions originating from said halide and/or pseudohalide compound and anions originating from said source of said cations of said electro-depositing mirror material, to a total molar concentration of said cations of said electro-depositing mirror material being greater than a ratio of six to one.

13. The optical device of claim 11 wherein:
    said electromagnetic means is provided for applying a negative electric field to one said electrodes near one of said sidewalls for actuating said optical device.

14. The optical device of claim 11 wherein:
    said electromagnetic means is provided for applying a negative electric field to one said electrodes near said trench floor surface for deactivating said optical device.

15. The optical device of claim 11 further comprising:
    an antireflective layer formed on said sidewalls.

16. The optical device of claim 11 wherein:
    said electrodes are optical transmissive electrodes.

17. The optical device of claim 11 further comprising:
    a substrate for supporting said optical device.

* * * * *